United States Patent
Hollis et al.

(10) Patent No.: US 6,418,082 B1
(45) Date of Patent: Jul. 9, 2002

(54) BOTTOM MOORED AND TETHERED SENSORS FOR SENSING AMPLITUDE AND DIRECTION OF PRESSURE WAVES

(75) Inventors: Warren C. Hollis, deceased, late of Reston, VA (US); by Mildred H. Hollis, Reston, VA (US), executrix (73) Assignee: Lockheed Martin Corporation, Bethesda, MD (US)

(*) Notice: Subject to any disclaimer, the term of this patent is extended or adjusted under 35 U.S.C. 154(b) by 0 days.

(21) Appl. No.: 09/599,230

(22) Filed: Jun. 22, 2000

Related U.S. Application Data
(60) Provisional application No. 60/141,752, filed on Jun. 30, 1999.

(51) Int. Cl.[7] .................................................. G01S 3/80
(52) U.S. Cl. ...................................................... 367/118
(58) Field of Search ............................... 367/136, 118, 367/119, 188, 173, 165, 154

(56) References Cited

U.S. PATENT DOCUMENTS

| | | |
|---|---|---|
| 1,115,363 A | 10/1914 | Wood |
| 2,422,337 A | 6/1947 | Chilowsky |
| 3,792,421 A | 2/1974 | Frazier |
| 4,800,542 A * | 1/1989 | Franklin et al. ............ 367/154 |
| 4,868,792 A | 9/1989 | Grado .......................... 367/13 |
| 5,138,587 A * | 8/1992 | Mason ........................ 367/136 |
| 5,412,622 A | 5/1995 | Pauer et al. ................. 367/154 |
| 5,457,662 A * | 10/1995 | Forster ........................ 367/119 |
| 5,557,584 A | 9/1996 | Suchman ..................... 367/131 |

* cited by examiner

*Primary Examiner*—Daniel T. Pihulic
(74) *Attorney, Agent, or Firm*—Dicke, Billig & Czaja, P.A.

(57) ABSTRACT

A bottom moored and tethered directional frequency analysis and ranging (DIFAR) sensor system deployable in a wide range of water depths. The system includes a mooring platform for anchoring the system to the bottom surface of a body of water. A buoyant chamber containing a DIFAR sensor is tethered to the mooring platform at a predetermined depth in the body of water. The DIFAR sensor includes two pairs of orthogonally oriented hydrophones and a compass for providing a directional magnetic reference signal. The tethered buoyant chamber is securely positioned such that hydrophones residing within the buoyant chamber are oriented in a plane substantially co-planer to the top surface of the body of water. By determining the angle between the directional magnetic reference signal and the hydrophones, the sensor system is able to compute heading information for a detected object. A transmitter is coupled to the DIFAR sensor for transmitting heading information detected by the DIFAR sensor to a receiver. The transmission can occur over a signal cable to a shore based receiver, or via a wireless radio frequency (RF) transmission.

35 Claims, 10 Drawing Sheets

BOTTOM MOORED AND TETHERED SENSORS FOR SENSING AMPLITUDE AND DIRECTION OF PRESSURE WAVES

CROSS REFERENCE TO RELATED APPLICATIONS

This Non-Provisional Utility Patent Application claims the benefit of the filing date of U.S. Provisional Application Serial No. 60/141,752, filed Jun. 30, 1999, entitled "BOTTOM MOORED AND TETHERED SENSORS FOR SENSING AMPLITUDE AND DIRECTION OF PRESSURE WAVES."

THE FIELD OF THE INVENTION

The present invention relates to the detection of objects in a body of water, and, more particularly to a bottom moored and tethered underwater sensor system deployable in a wide range of water depths.

BACKGROUND OF THE INVENTION

Many military missions involve surveillance of bodies of water to support submarine detection. Sonobuoys are often deployed to aid in the surveillance operations. Passive sonobuoys sense sounds, such as those sounds produced by propellers and machinery. Active sonobuoys bounce a sonar signal off the surface of an object such as a submarine. Active sonobuoys generally require a greater operating depth than passive sonobuoys.

Sonobuoys typically include a buoyant chamber containing one or more sensors and a transmitter. Sonobuoys can be dropped from aircraft equipped with a means to launch the sonobuoys and electric equipment to receive and process data from the sensors. Sonobuoys can also be hand launched over the side of a ship. In some instances, the sonobuoys include a seawater battery wich is energized upon salt water contact, which in turn activates a mechanism for inflating a urethane material float with $CO_2$ gas, which starts an ocean deployment sequence. Sonobuoys typically contain one or more sensors, such as hydrophones, for converting underwater sound to electrical signals which are amplified and transmitted via radio frequency (RF) to a surveillance receiver (eg., a P-3 maritime patrol aircraft).

During submarine detection activities in an ocean, a maritime patrol aircraft is normally directed to a surveillance area by other surveillance assets. The aircraft typically deploys multiple sonobuoys over a substantial area while attempting detection of the submarine. Upon detection of the submarine, the maritime patrol aircraft follows the submarine as it traverses an area of the ocean. Many sonobuoys are deployed in such a mission. A typical sonobuoy employed in such an operation has a life of approximately 8 hours, and automatically floods and sinks to the ocean bottom upon reaching its maximum service life.

Other surveillance missions, such as harbor defense and force protection use underwater acoustic sensors deployed in shallow water. Shallow water is nominally defined as a depth of approximately 4 feet to approximately 1000 feet. The targets of interest for these shallow water surveillance missions include: submarines, mini-submarines and high-speed, shallow-draft, surface craft. Shallow water surveillance missions typically employ fixed sensors for surveillance activities.

It is known in the art to employ bottom moored, omnidirectional sensors (i.e., scalar sensors) for surveillance missions. Omnidirectional sensors receive and convert the sound pressure wave energy generated by an underwater target object to a voltage. Omnidirectional sensors are capable of measuring only signal magnitude.

Directional frequency analysis and ranging (DIFAR) sensors have become increasingly important in sonobuoy applications. Unlike previous sensors, such as omnidirectional sensors that measure only signal magnitude, DIFAR sensors provide a magnetic bearing to contacts of interest. This added feature allows trackers to track a contact of interest with as few as one DIFAR sonobuoy, and fix the location of the contact with as few as two DIFAR sensors.

Figure 1:
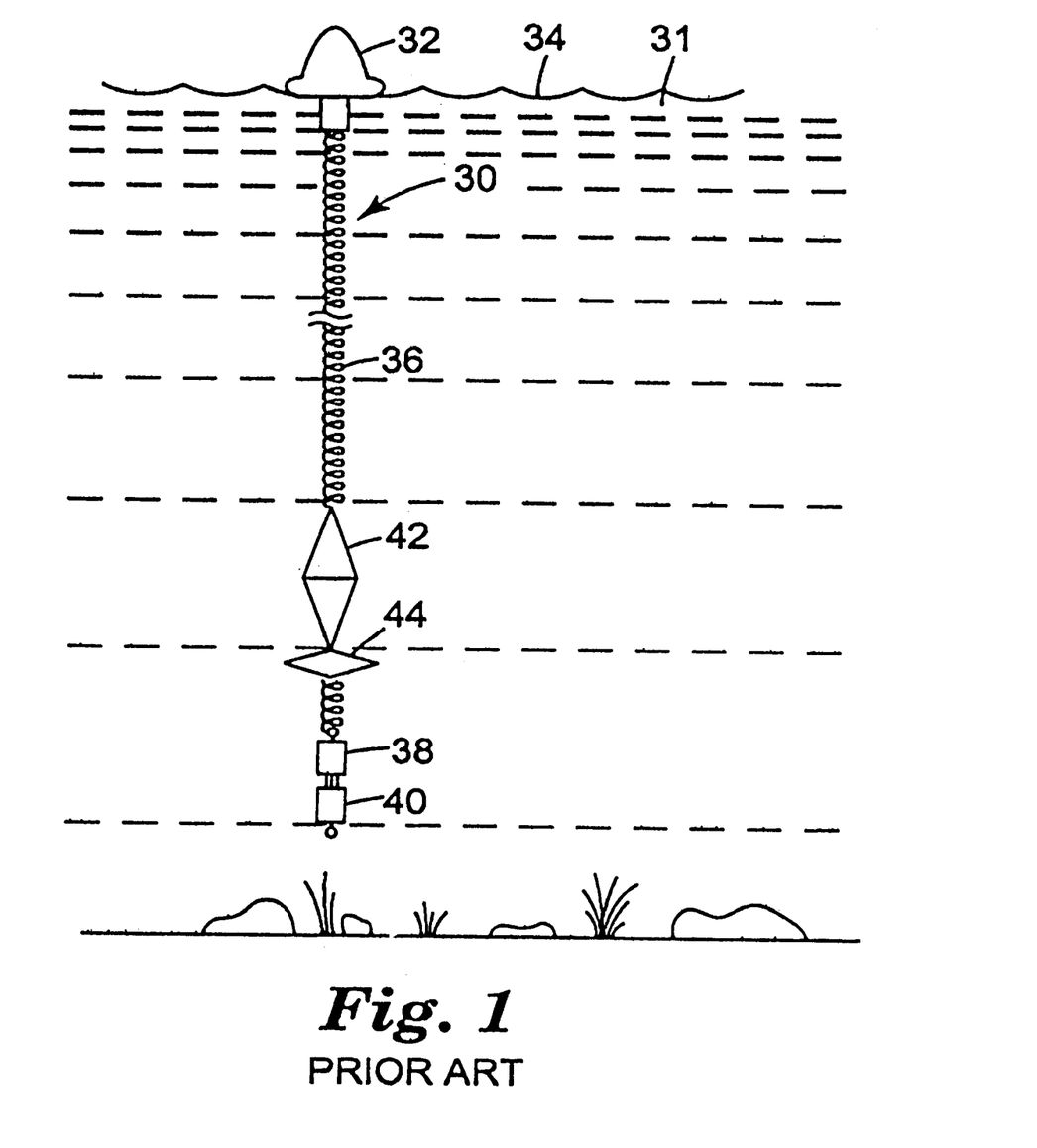
FIG. 1 is a prior art illustration of a sonobuoy having a directional sensor suspended from a flotation device positioned on the top surface of a body of water.

FIG. 1 illustrates a passive DIFAR sonobuoy 30 utilized by the United States Navy, and specifically referenced by number (AN/SSQ-53A). Sonobuoy 30 includes a surface float 32 having positive buoyancy deployed at an upper surface 34 of a body of water 31 to be monitored. Surface float 32 includes an antenna for transmitting detection data from sonobuoy 30 to a remote receiving station (not shown). Since DIFAR sonobuoys are extremely sensitive to the effect of flow across the sensor, sonobuoy 30 also includes a compliant assembly 36 suspended from top float 32 for providing and maintaining proper positioning for subsurface electronics 38 and hydrophones 40. Sonobuoy 30 further includes a drogue (i.e., sea anchor) 42 and a mass/damper 44 for limiting hydrophone 40 movement. In a typical deployment, the distance between surface float 32 and hydrophone 40 is, at a minimum, approximately 90 feet, and at a maximum, a proximately 1000 feet.

In view of the above, there is a need for a single type underwater sensor system which is capable of operating covertly in a wide variety of water depths, including very shallow water. This sensor system preferably employs a directional sensor, such as a DIFAR sensor, so that bearing information may be obtained on detected objects. The underwater sensor system must be deployed (i.e., oriented) in a stable configuration so that the directional sensors provide accurate measurements.

SUMMARY OF THE INVENTION

The present invention provides an apparatus including a mooring platform for anchoring the apparatus to a bottom ground surface covered by a body of water. The apparatus also includes a buoyant chamber, and a directional frequency analysis and ranging (DIFAR) sensor positioned within the buoyant chamber. The DIFAR sensor includes an x hydrophone pair for sensing sounds along an x axis, and a y hydrophone pair positioned orthogonally to the x hydrophone pair for sensing sounds along a y axis. Finally, the apparatus includes a tether having a first end and a second end. The first end of the tether is coupled to the mooring platform and the second end of the tether is coupled to the buoyant chamber to suspend the buoyant chamber a predefined distance from the bottom ground surface. The tether also orients the x hydrophone pair and the y hydrophone pair so that the x axis and the y axis form a plane substantially co-planer to a top surface of the body of water.

The buoyant chamber of the present invention can exhibit either positive or negative buoyancy. In the case of negative buoyancy, the mooring platform includes a raised arm for suspending the buoyant chamber. The apparatus may be powered by either an internal power supply or an external power supply. The external power supply is coupled to the apparatus via a signal cable routed along the bottom ground surface of the water. In one embodiment of the present invention, the buoyant chamber of the apparatus is deployed at a depth from approximately 4 feet to approximately 1000 feet from the top surface of the body of water. The apparatus of the present invention may also be recoverable for later deployment.

The present invention also provides an acoustic surveillance system for detecting objects in a body of water having a top surface, where the body of water covers a bottom ground surface. The acoustic surveillance system includes a mooring platform for anchoring the acoustic surveillance system to the bottom ground surface. The acoustic surveillance system also includes a buoyant chamber, and a compass positioned within the buoyant chamber for providing a directional magnetic reference signal. The acoustic surveillance system also includes a directional sensor positioned within the buoyant chamber. The directional sensor has an x hydrophone pair for sensing sounds along an x axis relative to the directional magnetic reference signal. The directional sensor also has a y hydrophone pair positioned orthogonally to the x hydrophone pair for sensing sounds along a y axis. The acoustic surveillance system further includes a tether having a first end and a second end. The first end of the tether is coupled to the mooring platform. The second end of the tether is coupled to the buoyant chamber to suspend the buoyant chamber a pre-defined distance from the bottom ground surface, and to orient the x hydrophone pair and the y hydrophone pair so that the x axis and the y axis form a plane substantially co-planer to the top surface of the body of water. Finally, the acoustic surveillance system includes a transmitter for transmitting the information detected by the directional sensor to a receiver.

In one embodiment of the present invention, the directional sensor is a directional frequency analysis and ranging (DIFAR) sensor. In alternate embodiments of the present invention, the transmitter transmits the information detected by the directional sensor to the receiver via ether a signal cable routed along the bottom ground surface of the water or a radio frequency (RF) transmission. In the radio frequency transmission embodiment, the transmitter further includes a frequency modulator for modulating the information detected by the directional sensor prior to transmission.

In a preferred embodiment of the present invention, the compass is a magnetic flux compass. In alternative embodiments of the present invention, the hydrophones are either pressure gradient hydrophones or accelerometer hydrophones.

The present invention also provides an acoustic surveillance system for detecting objects in a body of water having a top surface, where the body of water covers a bottom ground surface. The acoustic surveillance system includes mooring means for mooring the acoustic surveillance system to the bottom ground surface. The acoustic surveillance system also includes a buoyant chamber, and a compass positioned within the buoyant chamber for providing a directional magnetic reference signal. The acoustic surveillance system also includes a directional sensor positioned within the buoyant chamber. The directional sensor includes an x hydrophone pair for sensing sounds along an x axis relative to the directional magnetic reference signal. The directional sensor also includes a y hydrophone pair positioned orthogonally to the x hydrophone pair for sensing sounds along a y axis. The acoustic surveillance system further includes tethering means to tether the buoyant chamber to the mooring platform. The buoyant chamber is suspended a pre-defined distance from the bottom ground surface and is oriented so that the x axis of the x hydrophone pair and the y axis of the y hydrophone pair form a plane substantially co-planer to the top surface of the body of water. Finally the acoustic surveillance system includes transmitting means for transmitting the information detected by the directional sensor to a receiver.

In one embodiment of the present invention, the directional sensor is a directional frequency analysis and ranging (DIFAR) sensor. The buoyant chamber of the present invention can exhibit either positive or negative buoyancy.

The present invention also provides a method for deploying an acoustic surveillance system for detecting objects in a body of water having a top surface, where the body of water covers a bottom ground surface. The method begins by anchoring a mooring platform of the acoustic surveillance system to the bottom ground surface of the body of water. Next, a directional sensor assembly having two orthogonal hydrophone pairs and a compass are tethered to the mooring platform such that the two orthogonal hydrophone pairs are oriented in a plane substantially co-planer to the top surface of the water. The two orthogonal hydrophone pairs are further oriented relative to a directional magnetic reference signal provided by the compass. The directional sensor assembly is suspended a pre-defined distance from the bottom ground surface of the body of water.

The directional sensor assembly of this method may include a directional frequency analysis and ranging (DIFAR) sensor. The directional sensor assembly may also include a buoyant chamber, where the buoyant chamber may exhibit either positive or negative buoyancy. The mooring platform includes a raised arm for suspending the buoyant chamber when the buoyant chamber exhibits negative buoyancy.

The present invention offers the advantage of a low cost, reusable underwater acoustic surveillance system which is deployable in a wide range of water depths, including very shallow water. The present invention also offers the advantage of a directional sensor system which enables a user to obtain bearing information for a detected object. Finally, the present invention offers the advantage of a long operating life, since the present invention may be powered by an external power supply via a power/signal cable.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 2:
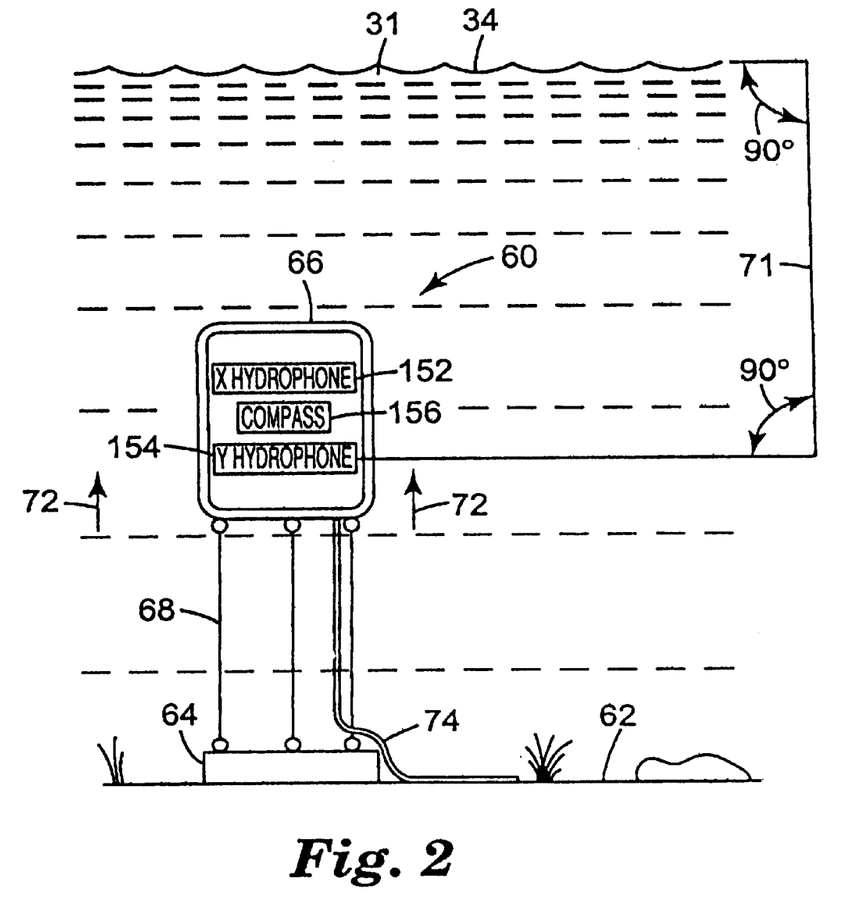
FIG. 2 is an illustration of a first embodiment of an acoustic surveillance system in accordance with the present invention, where a buoyant chamber enclosing a directional sensor is tethered to a mooring platform positioned at the bottom surface of a body of water.

A first embodiment of an acoustic surveillance system in accordance with the present invention, where a buoyant chamber 66 enclosing a directional sensor, such as a DIFAR sensor, is tethered (via tether 68) to a mooring platform 64 positioned at the bottom surface of a body of water, is illustrated generally at 60 in FIG. 2. In contrast to the prior art top surface suspended sonobuoy 30 illustrated in FIG. 1, sensor system 60 is moored to the bottom surface 62 of the body of water 31.

Buoyant chamber 66 is a waterproof container which encapsulates an x axis hydrophone pair and a y axis hydrophone pair for sensing sounds, functionally represented at 152 and 154, respectively. Buoyant chamber 66 also includes a compass, functionally represented at 156, which provides a directional magnetic reference signal. Buoyant chamber 66 exhibits positive buoyancy (i.e., buoyant chamber 66 is biased to move toward the top surface of the body of water), as indicated by arrow 72. The positive buoyancy force inherent in buoyant chamber 66 is restrained by tether 68, resulting in a highly stable orientation of buoyant chamber 66 within a column of water. This stable orientation orients x axis hydrophone pair 152 and y axis hydrophone pair 154 so that the x axis and the y axis of the hydrophones form a plane substantially co-planer to the top surface of the body of water, as shown generally at 71. This stable orientation enables the positionally sensitive hydrophone pairs 152 and 154 to remain positioned for optimal operational performance under most operating conditions.

Unlike the prior art sonobuoy 30 of FIG. 1, sensor system 60 illustrated in FIG. 2 is capable of being deployed in very shallow water (i.e., as shallow as proximately 4 feet of water). While prior art sonobuoy 30 of FIG. 1 requires an extensive apparatus (i.e., 90 feet or more in length) to dampen and counter wave and other surface disturbance forces present on sonobuoy 30 deployed at top water surface 34, bottom-moored sensor system 60 of the present invention requires a much simpler stabilizing mechanism, since sensor system 60 is not subject to the disturbing forces found at the top surface 34 of the body of water.

The embodiment of sensor system 60 illustrated in FIG. 2 transmits sensor detection information to a receiver (shown in FIG. 7 and described below) via signal cable 74. In an alternate embodiment (shown in FIG. 8 and described below), detection information may be transmitted by a radio frequency (RF) transmission. Signal cable 74 is preferable for covert operations, since no radio broadcast of detection information takes place.

Figure 3:
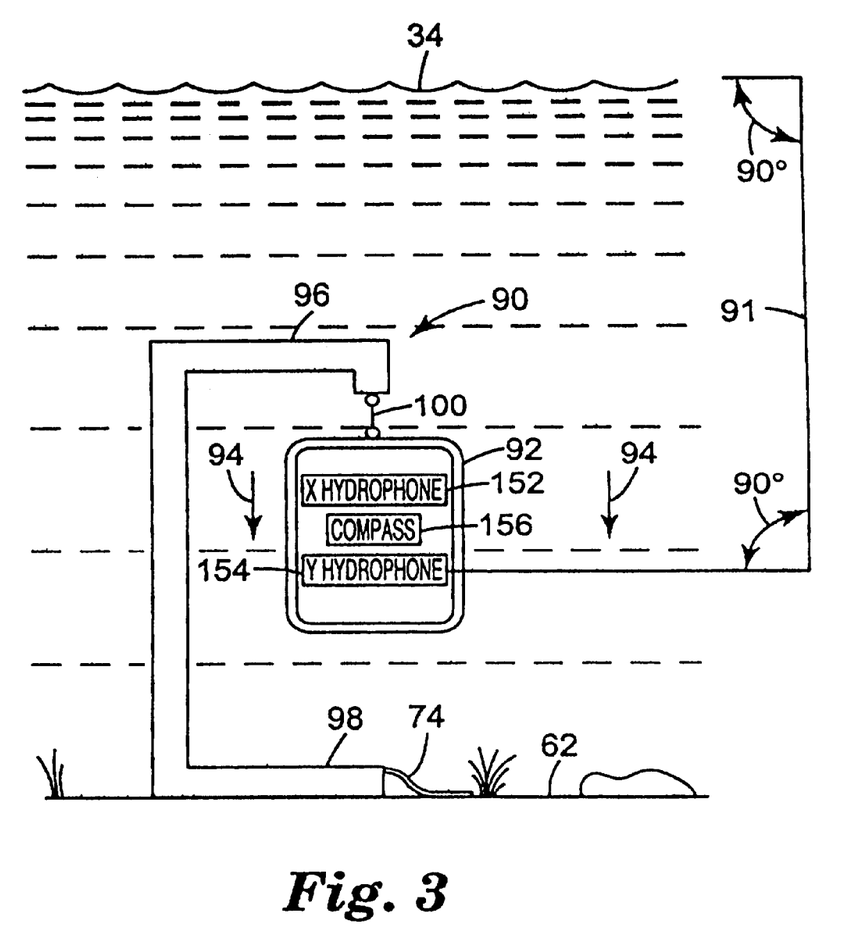
FIG. 3 is an illustration of a second embodiment of an acoustic surveillance system in accordance with the present invention, wherein a buoyant chamber enclosing a directional sensor is suspended from an arm of a mooring platform positioned at the bottom surface of a body of water.

A second embodiment of a bottom moored and tethered sensor system in accordance with the present invention, wherein a buoyant chamber enclosing a directional sensor is suspended from an arm of a mooring platform positioned at the bottom surface of a body of water, is illustrated generally at 90 in FIG. 3. In contrast to the positive buoyancy of buoyant chamber 66 illustrated in FIG. 2, sensor system 90 includes a buoyant chamber 92 which exhibits negative buoyancy. That is, buoyant chamber 92 is biased to move toward the bottom surface of the body of water 62, as indicated by arrow 94. In this embodiment, buoyant chamber 92 is suspended from an elevated arm 96 of a mooring platform 98 via a tether 100. The negative buoyancy force inherent in buoyant chamber 92 is restrained by tether 100, resulting in a highly stable orientation of buoyant chamber 92 within a column of water. This stable orientation orients x axis hydrophone pair 152 and y axis hydrophone pair 154 so that the x axis and the y axis of the hydrophones form a plane substantially co-planer to the top surface of the body of water, as shown generally at 91. This stable orientation enables the positionally sensitive hydrophone pairs 152 and 154 to remain positioned for optimal performance under all operating conditions.

In a manner similar to positive buoyancy sensor system 60 illustrated in FIG. 2, negative buoyancy sensor system 90 illustrated in FIG. 3 is also bottom moored and is capable of being deployed in very shallow water (i.e., as shallow as approximately 4 feet of water). The embodiment of sensor system 90 illustrated in FIG. 3 transmits detection information via a signal cable 74.

Figure 4:
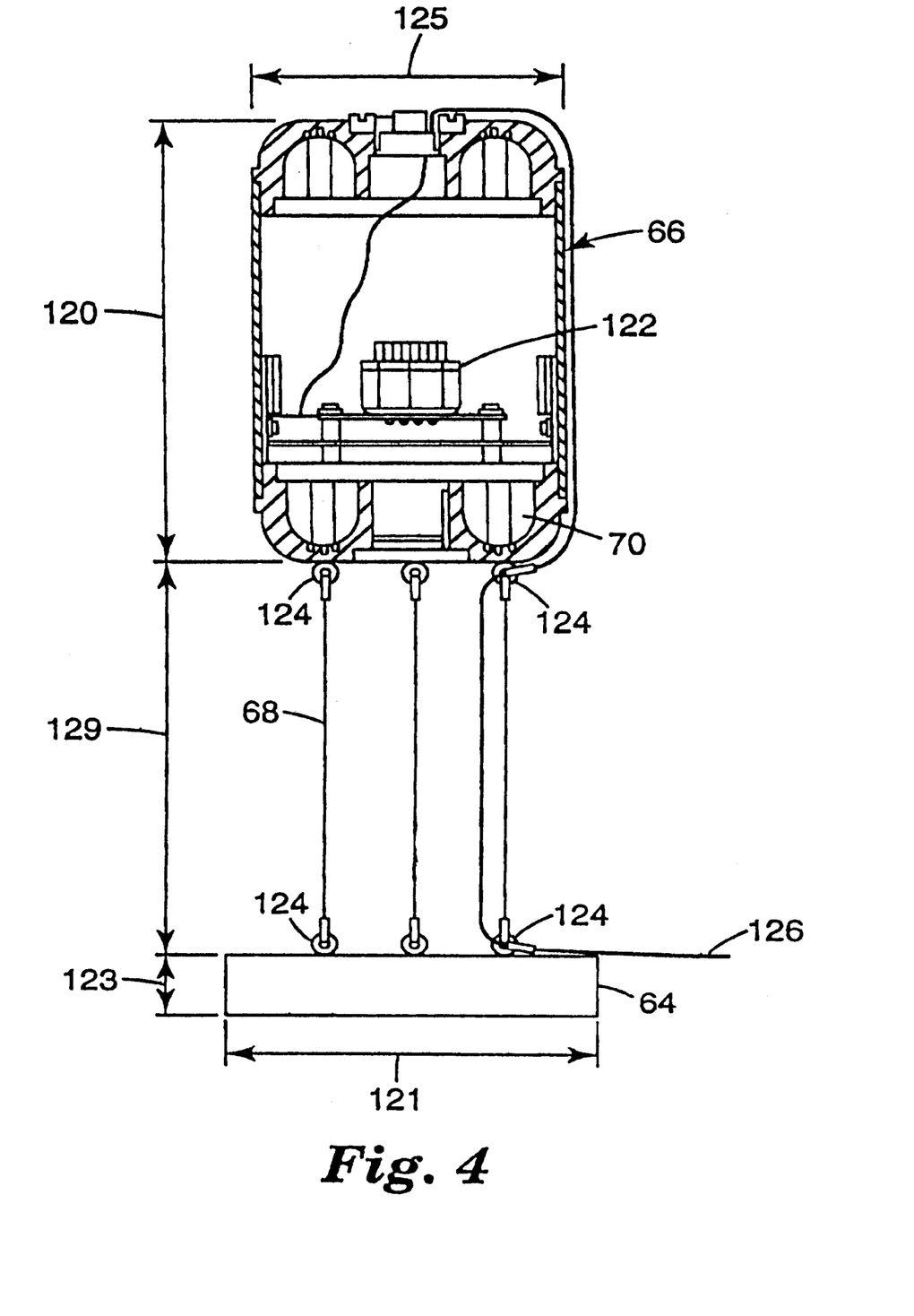
FIG. 4 is a detailed illustration of one embodiment of a bottom moored directional sensor in accordance with the present invention.

One embodiment of a bottom moored and tethered sensor system in accordance with the present invention, is illustrated generally in more detail at 120 in FIG. 4. In one example embodiment, mooring platform 64 is a weighted structure capable of anchoring the sensor system 120 to the bottom surface of the body of water. In one embodiment of the present invention, mooring platform is manufactured from a non-ferrous material, has a diameter indicated by arrows 121 of approximately 7 inches, a height indicated by arrows 123 of approximately 1½ inches, and a weight of approximately 5 pounds.

Buoyant chamber 66 encapsulates the DIFAR sensors and associated electronics, shown generally at 70, in a water tight enclosure. Buoyant chamber 55 has a width indicated by arrows 125 of approximately 5 inches, and a height indicated by arrows 127 of approximately 8 inches. Buoyant chamber 66 is tethered to mooring platform by tether 68. In a preferred embodiment, tether 68 is implemented as a series of four adjustable length cables, threaded through eyelets 124 located on the bottom surface of buoyant chamber 66 and to the top surface of mooring platform 64. In a preferred embodiment, cables are nylon tether lines having a diameter of approximately ¹⁄₁₆ inch, and a length of approximately 6 inches to 3 feet, as indicated by arrows 129. In this embodiment, buoyant chamber 66 exhibits positive buoyancy. That is, when deployed in a body of water, buoyant chamber 66 will move toward the top surface of the body of water, but will be restrained by tether 68. By mooring buoyant chamber 66 to mooring platform 64, DIFAR sensors and associated electronics 70 are properly positioned within a water column to ensure proper operation. Signal cable 74 is routed from buoyant chamber 66 to mooring platform 64, and then to a receiver (not shown).

Figure 5:
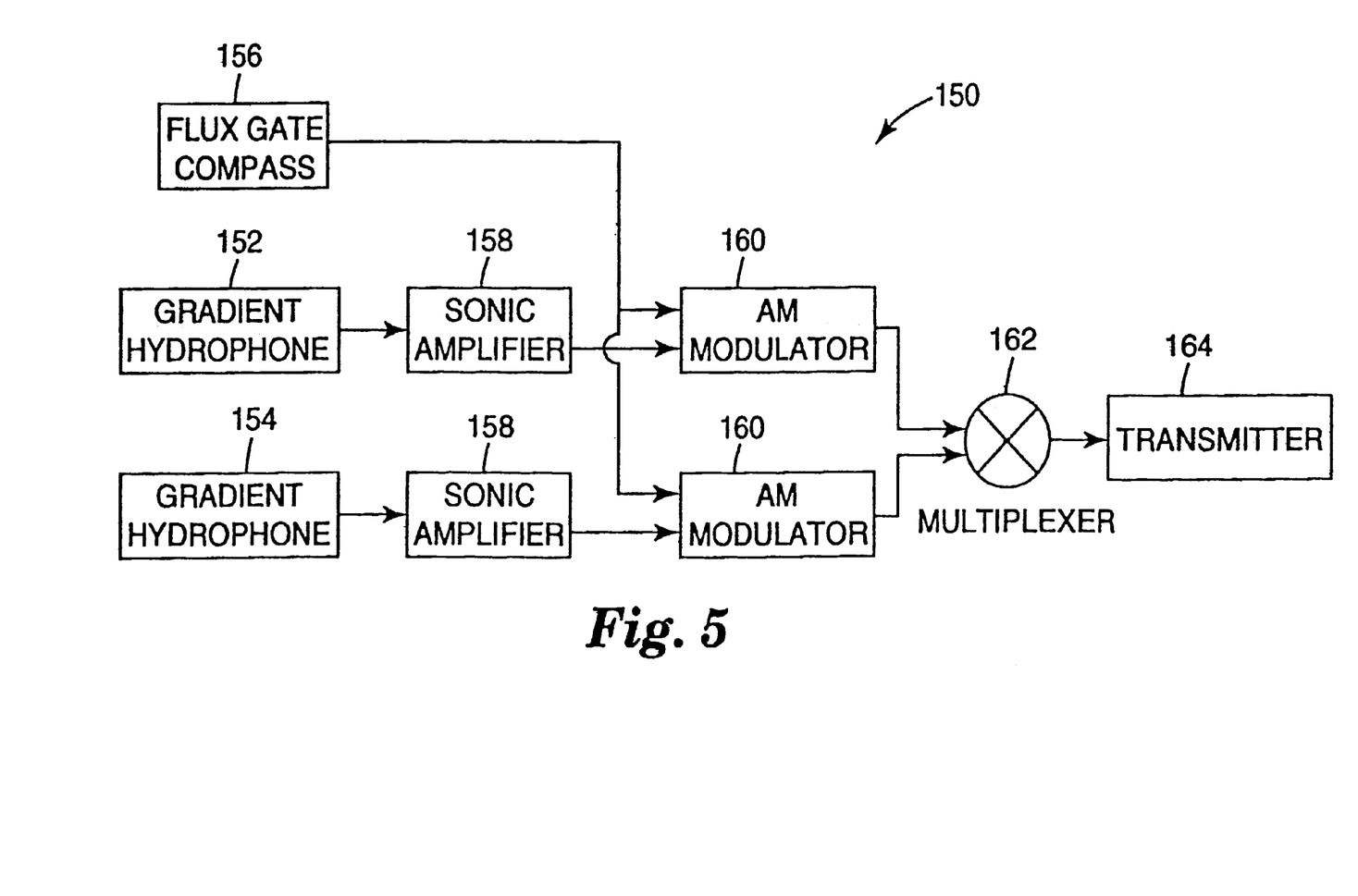
FIG. 5 is a simplified block diagram of the major components found within the bottom moored and tethered sensor system of the present invention.

FIG. 5 is a simplified block diagram of the major components found within the bottom moored and tethered sensor system of the present invention, as shown generally at 150. Sensor system 150 of the present invention includes two directional hydrophone pairs 152 and 154. Directional hydrophone pairs 152 and 154 are accelerometer hydrophones or pressure gradient hydrophones. Because of their directional characteristic, hydrophone pairs 152 and 154 impose a cosine shaped response to an arriving signal. X gradient hydrophone pair 152 and Y gradient hydrophone pair 154 are wired in series and arranged such that the sensitivity axis of the pair is aligned with an internal flux gate compass 156 to magnetic North. X gradient hydrophone 152 (i.e., the cosine hydrophone), is mounted orthogonally to Y gradient hydrophone 154 (i.e., the sine hydrophone), wich provides East/West data. By properly combining the sine and cosine responses, the arctangent or direction of the signal arrival may be determined.

The names "sine" and "cosine" are derived from the trigonometric relationships of the outputs of the respective hydrophone pairs 152 and 154 relative to the source angle of the sonic input. Both X gradient hydrophone pair 152 and Y gradient hydrophone pair 154 are substantially identical, differing only in physical orientation.

In a preferred embodiment of the present invention, compass 156 is a flux gate compass. Flux gate compass 156 provides a directional magnetic reference signal. As the orientation of hydrophone pairs 152 and 154 cannot be physically controlled, it is necessary to provide a magnetic North referencing system.

Part of the sensor system assembly process includes positioning flux gate compass 156 in physical alignment with respect to the X gradient hydrophone pair 152. This establishes the reference axis for all future phase angles either created in the sensor system or received from incoming signals. In one embodiment, flux gate compass 156 will effectively operate at tilt angles up to plus or minus ten degrees within a specified accuracy of plus or minus five degrees.

Sonic amplifier 158 amplifies a low-level voltage signal obtained from hydrophone pairs 152 and 154 to produce an amplified signal. Sonic amplifier also establishes the low/high end response, sensitivity and octave response slope for the amplified signal (i.e. sine/cosine data) generated by sonic amplifier 158.

AM modulator 160 provides amplitude modulation of the amplified sine/cosine data from amplifier 158. Multiplexer 162 combines the amplified/modulated signals (i.e. sine/cosine data) into a composite signal, which is delivered to transmitter 164 via a line driver circuit.

Figure 6:
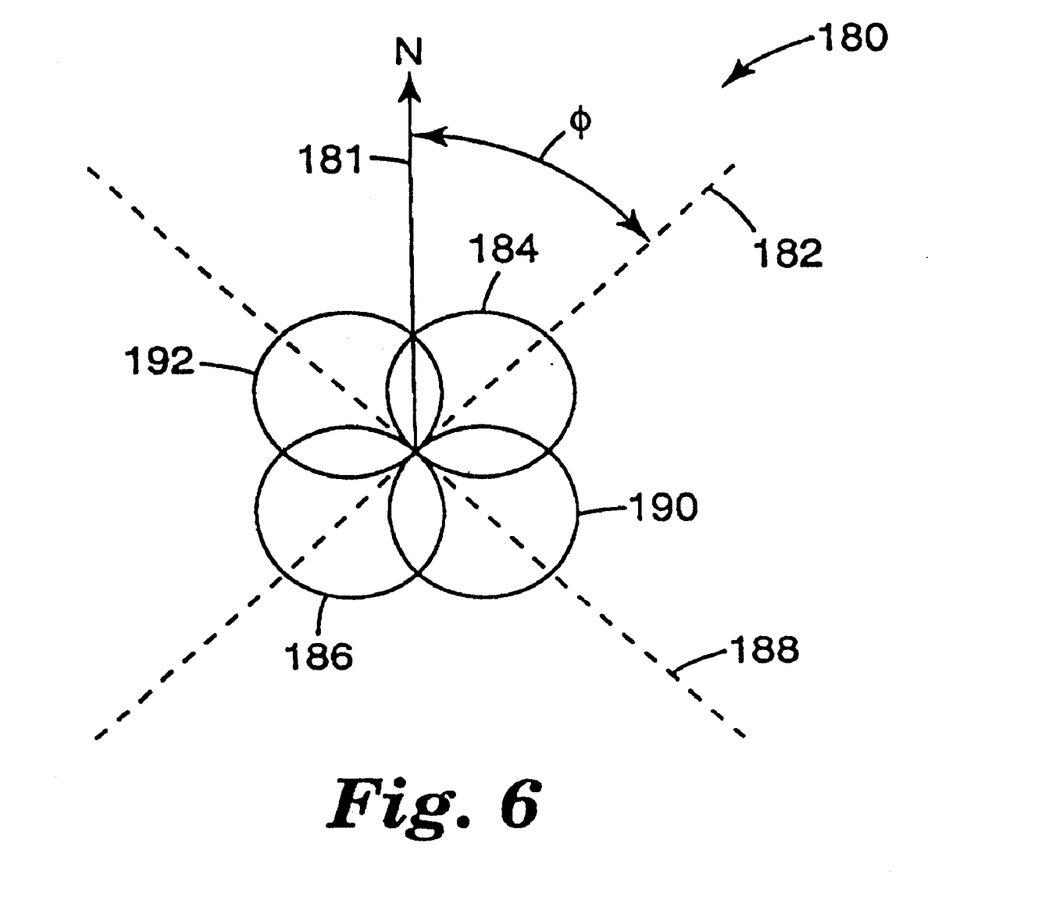
FIG. 6 is an illustration of x-axis and y-axis hydrophone beam patterns and their relationship to buoy orientation relative to magnetic North.

FIG. 6 is an illustration of x-axis and y-axis hydrophone beam patterns and their relationship to sensor orientation relative to magnetic North, as shown generally at 180. Directional hydrophone pairs 152 and 154, introduced previously in FIG. 5, are also known as vector phones, since they measure amplitude and direction. Because of their directional characteristic, they impose a cosine shaped response to the arriving signal.

X gradient hydrophone pair 152 (i.e., the cosine hydrophone) is aligned along a North/South reception field by determining the angle φ between the reception field and magnetic north reference signal as determined by the flux gate compass (FIG. 5, element 156). Y gradient hydrophone 154 pair (i.e. the sine hydrophone) is mounted orthogonally to X gradient hydrophone pair 152 along an East/West reception field. X gradient hydrophone 152 pair creates a "figure eight" sensitivity pattern oriented along a main response axis 182 of X gradient hydrophone pair 152. The "figure eight" sensitivity pattern of X gradient hydrophone pair 152 has a "+" lobe 184 and a "−" lobe 186. In a similar manner, Y gradient hydrophone pair 154 creates a second, "figure eight" sensitivity pattern oriented along a main response axis 188 of Y gradient hydrophone pair 154. The "figure eight" sensitivity pattern of Y gradient hydrophone pair 154 has a "+" lobe 190 and a "−" lobe 192. By properly combining the sine and cosine signal responses, the arctangent or direction of the signal arrival may be determined.

Figure 7:
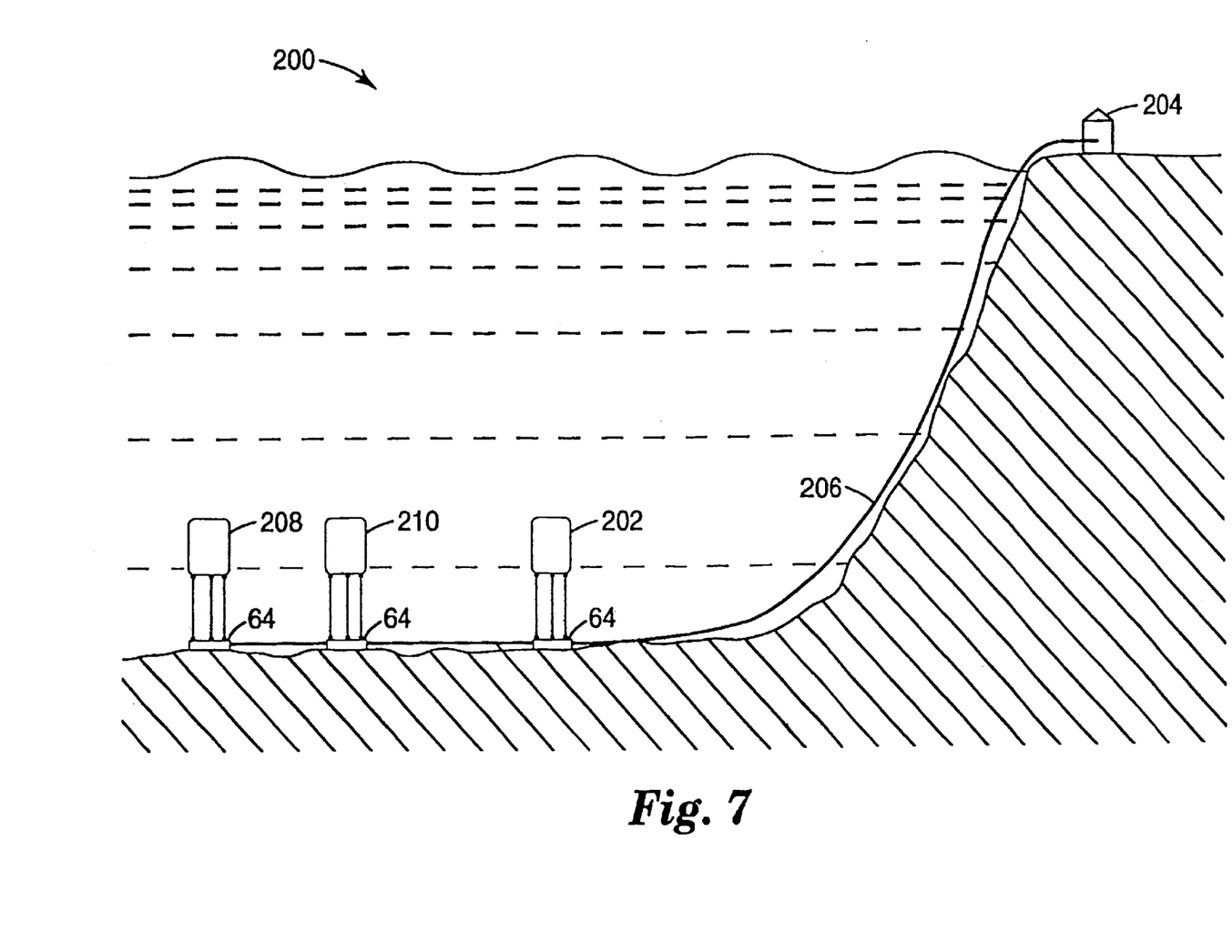
FIG. 7 illustrates a first embodiment of a signal transmission system utilized by the bottom moored and tethered sensor system of the present invention, where the signal transmission is carried to a receiver via a signal line.

FIG. 7 illustrates a first embodiment of a signal transmission system utilized by a bottom moored and tethered sensor system 202 of the present invention. In this embodiment, the signal transmission is carried from sensor systems 202, 208 and 210 to a land based receiver station 204 via a signal line 206, as shown generally at 200. A plurality of sensor systems 202, 208 and 210 may be deployed to enhance the signal coverage area. Signal line 206 is any line capable of carrying signal detection information from sensor systems 202, 208 and 210 to land based receiver 204. In one embodiment, signal line 206 may also include an additional power line for powering sensor systems 202, 208 and 210 from land based receiver station 204. Such a power line 206 eliminates the need for sensor systems 202, 208 and 210 to have its own independent power source.

This first embodiment signal transmission system is especially well suited for covert operational surveillance, since no radio transmissions of data are required (i.e., radio transmissions are much more susceptible to eavesdropping than wire transmissions). Additionally, radio transmissions from a sensor system require that a transmitting unit antenna be exposed above the surface of the body of water, thus increasing the possibility of visual detection. In the illustrated embodiment, the signal cable is deployed along the bottom surface of the body of water, invisible to anyone above the surface of the body of water. Signal line 206 offers another advantage in that it enables easy retrieval of sensor systems 202, 208 and 210. A user simply has to wind up signal line 206 to retrieve sensor systems 202, 208 and 210.

In the illustrated embodiment, mooring platform 64 includes ballast weight to moor sensor systems 202, 208 and 210 to the bottom surface of the body of water. Mooring platform 64 also includes cable connectors which enable sensor system to sensor system signal line interconnection as well as sensor to shore signal line interconnection. Mooring platform 64 further includes electrical components for receiving power from shore and multiplexing outgoing data from sensor systems 200, 208 and 210 for transmission to shore.

Figure 8:
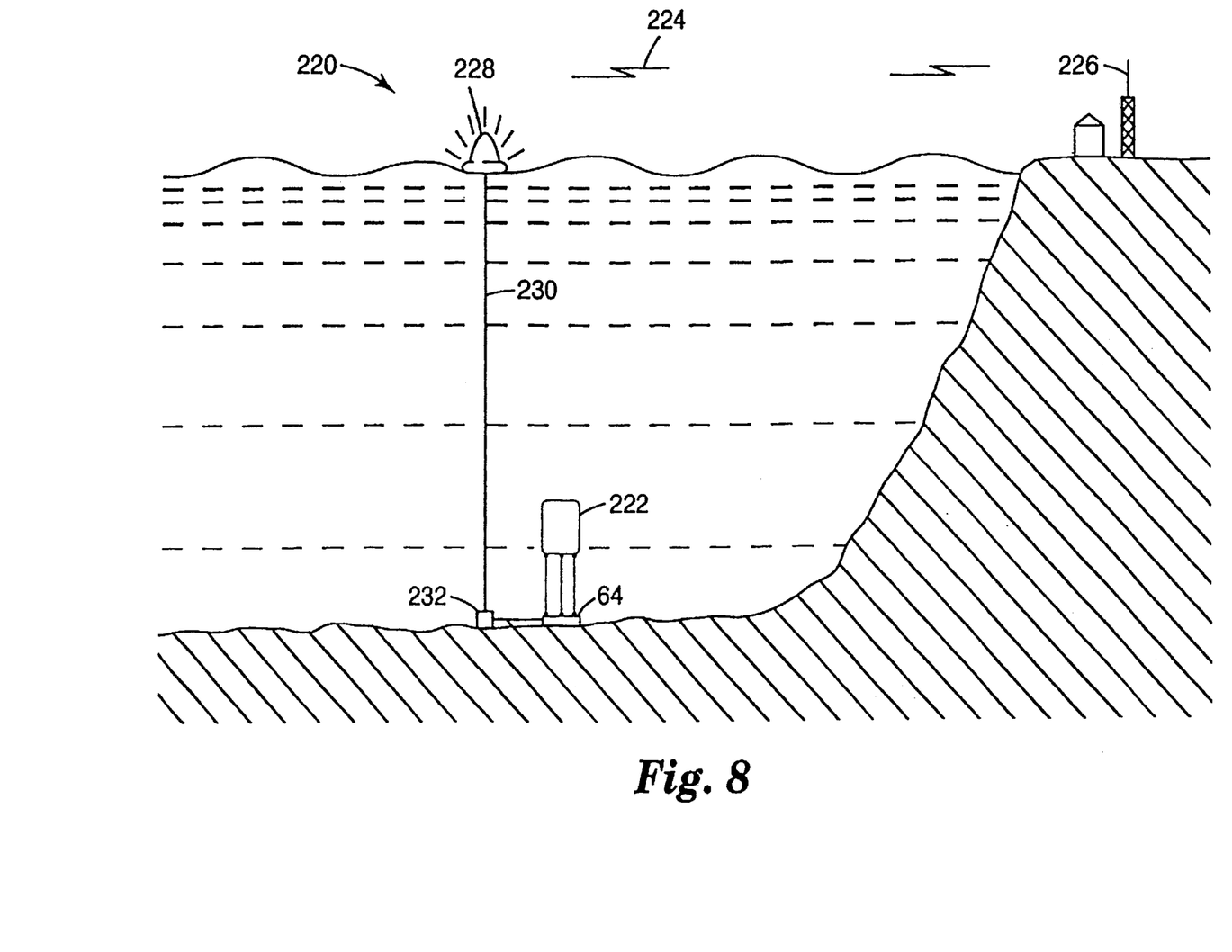
FIG. 8 illustrates a second embodiment of a signal transmission system utilized by the bottom moored and tethered sensor system of the present invention, where the signal is transmitted by radio frequency (RF) means to a receiver.

FIG. 8 illustrates a second embodiment of a signal transmission system utilized by a bottom moored and tethered sensor system 222 of the present invention. In this embodiment, the signal transmission is broadcast from sensor system 222 via a radio frequency (RF) transmission 224 to a land based receiver station 226, as shown generally at 220. Radio frequency transmission 224 requires an antenna rising above the top surface of the body of water in order to enable the broadcast. In the illustrated embodiment, surface float 228 includes an antenna for broadcasting the detection signal to the land based receiver station 226. A signal cable 230 couples bottom moored sensor system 222 to the antenna of surface float 228. In the illustrated embodiment, a second mooring platform 232 is positioned under surface float 228.

A bottom moored and tethered sensor system incorporating a radio frequency transmitter offers the advantage of placement flexibility over a bottom moored and tethered sensor system utilizing an external signal cable to carry the signal. As an example, if the bottom moored and tethered sensor system is to be deployed in deep water far from shore, running a signal cable from the sensor system to a shore based receiving station may prove impracticable.

In the illustrated embodiment, mooring platform 64 includes ballast weight to moor sensor systems 202, 208 and 210 to the bottom surface of the body of water. Mooring platform 64 further includes a power supply for powering sensor system 222.

Figure 9:
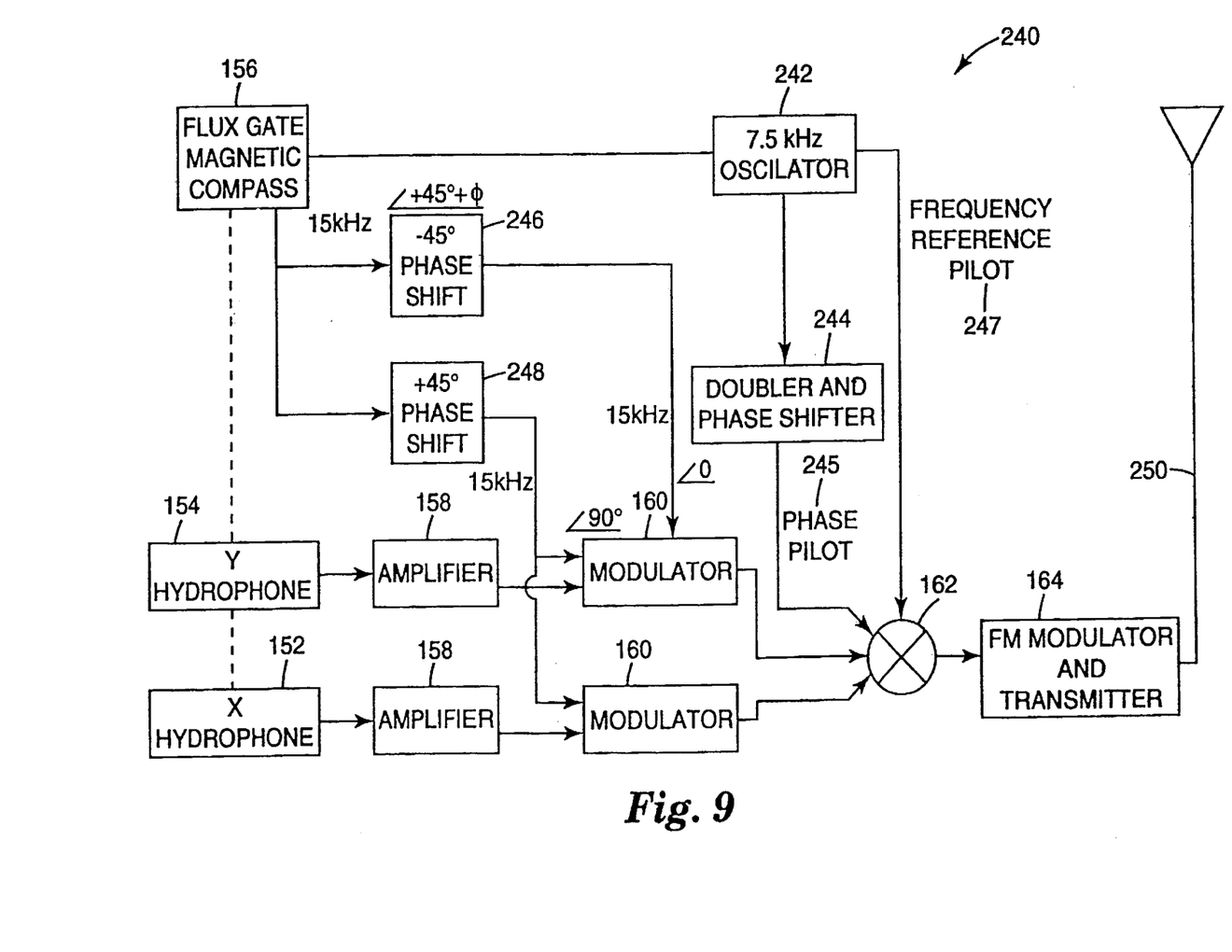
FIG. 9 is a block diagram illustrating one embodiment of a multiplexing scheme including magnetic correction functions in accordance with the present invention.

FIG. 9 is a block diagram illustrating one embodiment of a multiplexing scheme including magnetic correction functions in accordance with the present invention, as shown generally at 240. As previously described in greater detail in FIG. 5, hydrophone pairs 152 and 154 detect signals which are amplified 158 before being passed to amplitude modulator 160. The signals from X hydrophone pair 152 and Y hydrophone pair 154 are multiplexed because they both occupy the same audio frequency band of 5 to 2400 Hz. Two pilot tones, a phase pilot 245 and a frequency reference pilot 247 are also multiplexed by multiplexer 162.

The formation of a DIFAR composite output signal at the multiplexer output begins with the generation of a 7.5 kHz signal from an oscillator circuit 242. The 7.5 kHz signal that is directed to multiplexer 162 has a known and predetermined phase angle. This is referred to as the frequency reference pilot 247. A 7.5 kHz signal is also routed to a doubler and phase shift circuit 244. Doubler and phase shift circuit 244 has an output of 15 kHz and the phase is shifted a predetermined amount referenced to magnetic North. This signal is known as the phase pilot tone 245. Phase pilot tone 245 additionally provides the carrier frequency for the amplitude modulated directional data known as the DIFAR sidebands.

The formation of the compass corrected directional data takes place in flux gate compass 156. Part of the sensor system assembly process includes accurate positioning of the flux gate compass 156 so that the compass is in alignment with the North/South cosine channel of X hydrophone 152. This establishes the reference axis for all future phase angles either created in the sensor system or received from incoming signals. Flux gate compass 156 receives as input a 7.5 kHz signal from 7.5 kHz oscillator 242. Second order harmonics of this signal or a 15 kHz signal is generated in each secondary winding proportional to the cosine of the angle subtended by the winding axis and the Earth's magnetic field vector. These outputs are summed to provide an output signal with an electrical phase that corresponds to the magnetic bearing angle.

The 15 kHz output signal of flux gate compass 156 is applied to two phase shift networks 246 and 248. Phase shift network 246 phase shifts the 15 kHz signal by −45 degrees referenced the sine (Y) axis, and the other phase shift network 248 shifts the 15 kHz signal +45 degrees referenced to the cosine (X) axis. This results in the sine (X) and cosine (Y) networks being 90 degrees out of phase, but the phase pilot 245 reference being aligned with magnetic North. The sine (X) and cosine (Y) networks each contain audio information in the frequency band of 5–2400 Hz. This audio information is amplitude modulated 160 with an AM carrier frequency of 15 kHz, phase shifted by 90 degrees and referenced to magnetic North. The sine (X) and cosine (Y) data is then mathematically summed by multiplexer 164, frequency modulated and transmitted 164 via an antenna 250 or a signal cable (not illustrated).

Figure 10:
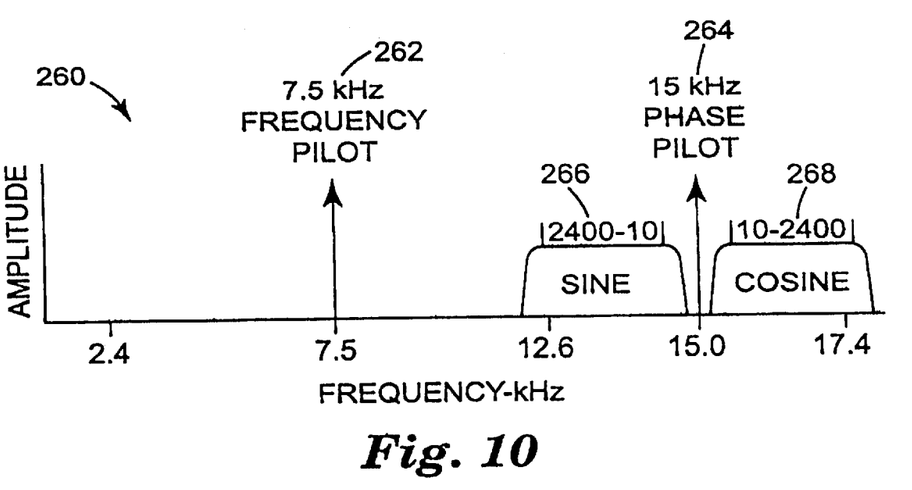
FIG. 10 illustrates a frequency map of DIFAR multiplexed data in accordance with the present invention.

FIG. 10 illustrates a frequency map of DIFAR multiplexed data in accordance with the present invention, as shown generally at 260. Both the 7.5 kHz frequency pilot 262 and 15 kHz phase pilot 264 are displayed at their corresponding frequencies. The sine frequency range 266 of the multiplexed data is found to the left of 15 kHz phase pilot signal 264 at approximately 12 to 15 kHz, and the cosine frequency range 268 of the multiplexed data is found to the right of 15 kHz phase pilot signal 264 at approximately 15 kHz to 18 kHz.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the electrical, mechanical and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. An apparatus comprising:
    a mooring platform for anchoring the apparatus to a bottom ground surface covered by a body of water;
    a buoyant chamber;
    a directional frequency analysis and ranging (DIFAR) sensor positioned within the buoyant chamber, the DIFAR sensor including:
        an x hydrophone pair for sensing sounds along an x axis;
        a y hydrophone pair positioned orthogonally to the x hydrophone pair for sensing sounds along a y axis; and
    a tether having a first end and a second end, wherein the first end of the tether is coupled to the mooring platform and the second end of the tether is coupled to the buoyant chamber to suspend the buoyant chamber a pre-defined distance from the bottom ground surface, and to orient the x hydrophone pair and the y hydrophone pair so that the x axis and the y axis form a plane substantially co-planer to a top surface of the body of water.

2. The apparatus of claim 1, wherein the buoyant chamber exhibits positive buoyancy.

3. An apparatus comprising:
    a mooring platform for anchoring the apparatus to a bottom ground surface covered by a body of water;
    a buoyant chamber which exhibits negative buoyancy;
    a directional frequency analysis and ranging (DIFAR) sensor positioned within the buoyant chamber, the DIFAR sensor including:
        in x hydrophone pair for sensing sounds along an x axis;
        a y hydrophone pair positioned orthogonally to the x hydrophone pair for sensing sounds along a y axis; and
    a tether having a first end and a second end, wherein the first end of the tether is coupled to the mooring platform and the second end of the tether is coupled to the buoyant chamber to suspend the buoyant chamber a pre-defined distance from the bottom ground surface, and to orient the x hydrophone pair and the y hydrophone pair so that the x axis and the y axis form a plane substantially co-planer to a top surface of the body of water.

4. The apparatus of claim 3, wherein the mooring platform includes a raised arm for suspending the buoyant chamber.

5. The apparatus of claim 1, wherein the apparatus is powered by an internal power supply.

6. The apparatus of claim 1, wherein the system is powered by an external power supply.

7. The apparatus of claim 6, wherein the external power supply is coupled to the apparatus via a signal cable routed along the bottom ground surface of the water.

8. The apparatus of claim 1, wherein buoyant chamber is deployed at a depth from approximately 4 feet to approximately 1000 feet from the top surface of the body of water.

9. The apparatus of claim 1, wherein the apparatus is recoverable for later deployment.

10. An acoustic surveillance system for detecting objects in a body of water having a top surface, the body of water covering a bottom ground surface, the acoustic surveillance system comprising:
  a mooring platform for anchoring the acoustic surveillance system to the bottom ground surface;
  a buoyant chamber;
  a compass positioned within the buoyant chamber for providing a directional magnetic reference signal;
  a directional sensor positioned within the buoyant chamber, the directional sensor having an x hydrophone pair for sensing sounds along an x axis relative to the directional magnetic reference signal and a y hydrophone pair positioned orthogonally to the x hydrophone pair for sensing sounds along a y axis;
  a tether having a first end and a second end, wherein the first end of the tether is coupled to the mooring platform and the second end of the tether is coupled to the buoyant chamber to suspend the buoyant chamber a pre-defined distance from the bottom ground surface, and to orient the x hydrophone pair and the y hydrophone pair so that the x axis and the y axis form a plane substantially co-planer to the top surface of the body of water; and
  a transmitter for transmitting the information detected by the directional sensor to a receiver.

11. The acoustic surveillance system of claim 10, wherein the directional sensor is a directional frequency analysis and ranging (DIFAR) sensor.

12. The acoustic surveillance system of claim 10, wherein the buoyant chamber exhibits positive buoyancy.

13. An acoustic surveillance system for detecting objects in a body of water having a top surface, the body of water covering a bottom ground surface, the acoustic surveillance system comprising:
  a mooring platform for anchoring the acoustic surveillance system to the bottom ground surface;
  a buoyant chamber which exhibits negative buoyancy;
  a compass positioned within the buoyant chamber for providing a directional magnetic reference signal;
  a directional sensor positioned within the buoyant chamber, the directional sensor having an x hydrophone pair for sensing sounds along an x axis relative to the directional magnetic reference signal and a y hydrophone pair positioned orthogonally to the x hydrophone pair for sensing sounds along a y axis;
  a tether having a first end and a second end, wherein the first end of the tether is coupled to the mooring platform and the second end of the tether is coupled to the buoyant chamber to suspend the buoyant chamber a pre-defined distance from the bottom ground surface, and to orient the x hydrophone pair and the y hydrophone pair so that the x axis and the y axis form a plane substantially co-planer to the top surface of the body of water; and
  a transmitter for transmitting the information detected by the directional sensor to a receiver.

14. The acoustic surveillance system of claim 13, wherein the mooring platform includes a raised arm for suspending the buoyant chamber.

15. The acoustic surveillance system of claim 10, wherein the transmitter transmits the information detected by the directional sensor to the receiver via a signal cable routed along the bottom ground surface of the water.

16. The acoustic surveillance system of claim 10, wherein the transmitter transmits the information detected by the directional sensor to the receiver via a radio frequency (RF) transmission.

17. The acoustic surveillance system of claim 16, wherein the transmitter further includes:
  a frequency modulator for modulating the information detected by the directional sensor prior to transmission.

18. The acoustic surveillance system of claim 10, wherein the system is powered by an internal power supply.

19. The acoustic surveillance system of claim 10, wherein the system is powered by an external power supply.

20. The acoustic surveillance system of claim 19, wherein the external power supply is coupled to the system via a signal cable routed along the bottom ground surface of the water.

21. The acoustic surveillance system of claim 10, wherein buoyant chamber is deployed at a depth from approximately 4 feet to approximately 1000 feet from the top surface of the body of water.

22. The acoustic surveillance system of claim 10, wherein the system is recoverable for later deployment.

23. The acoustic surveillance system of claim 10, wherein the compass is a magnetic flux compass.

24. The acoustic surveillance system of claim 10, wherein the x hydrophone pair and the y hydrophone pair are pressure gradient hydrophones.

25. The acoustic surveillance system of claim 10, wherein the x hydrophone pair and the y hydrophone pair are accelerometer hydrophones.

26. An acoustic surveillance system for detecting objects in a body of water having a top surface, the body of water covering a bottom ground surface, the acoustic surveillance system comprising:
  mooring means for mooring the acoustic surveillance system to the bottom ground surface;
  a buoyant chamber;
  a compass positioned within the buoyant chamber for providing a directional magnetic reference signal;
  a directional sensor positioned within the buoyant chamber, the directional sensor having an x hydrophone pair for sensing sounds along an x axis relative to the directional magnetic reference signal and a y hydrophone pair positioned orthogonally to the x hydrophone pair for sensing sounds along a y axis;
  tethering means for tethering the buoyant chamber to the mooring platform, wherein the buoyant chamber is suspended a pre-defined distance from the bottom ground surface and oriented so that the x axis of the x hydrophone pair and the y axis of the y hydrophone pair form a plane substantially co-planer to the top surface of the body of water; and
  transmitting means for transmitting the information detected by the directional sensor to a receiver.

27. The acoustic surveillance system of claim 26, wherein the directional sensor is a directional frequency analysis and ranging (DIFAR) sensor.

28. The acoustic surveillance system of claim 26, wherein the buoyant chamber exhibits positive buoyancy.

29. An acoustic surveillance system for detecting objects in a body of water having a top surface, the body of water covering a bottom ground surface, the acoustic surveillance system comprising:

mooring means for mooring the acoustic surveillance system to the bottom ground surface;

a buoyant chamber which exhibits negative buoyancy;

a compass positioned within the buoyant chamber for providing a directional magnetic reference signal;

a directional sensor positioned within the buoyant chamber, the directional sensor having an x hydrophone pair for sensing sounds along an x axis relative to the directional magnetic reference signal and a y hydrophone pair positioned orthogonally to the x hydrophone pair for sensing sounds along a y axis;

tethering means for tethering the buoyant chamber to the mooring platform, wherein the buoyant chamber is suspended a pre-defined distance from the bottom ground surface and oriented so that the x axis of the x hydrophone pair and the y axis of the y hydrophone pair form a plane substantially co-planer to the top surface of the body of water; and transmitting means for transmitting the information detected by the directional sensor to a receiver.

30. A method for deploying an acoustic surveillance system for detecting objects in a body of water having a top surface, the body of water covering a bottom ground surface, the method comprising the steps of:

anchoring a mooring platform of the acoustic surveillance system to the bottom ground surface of the body of water; and tethering a directional sensor assembly having two orthogonal hydrophone pairs and a compass to the mooring platform such that the two orthogonal hydrophone pairs are oriented in a plane substantially co-planer to the top surface of the water, wherein the two orthogonal hydrophone pairs are further oriented relative to a directional magnetic reference signal provided by the compass, and wherein the directional sensor assembly is suspended a pre-defined distance from the bottom ground surface of the body of water.

31. The method of claim 30, wherein the directional sensor assembly includes directional frequency analysis and ranging (DIFAR) sensor.

32. The method of claim 30, wherein the directional sensor assembly includes a buoyant chamber.

33. The method of claim 32, wherein the buoyant chamber exhibits positive buoyancy.

34. A method for deploying an acoustic surveillance system for detecting objects in a body of water having a top surface, the body of water covering a bottom ground surface, the method comprising the steps of:

anchoring a mooring platform of the acoustic surveillance system to the bottom ground surface of the body of water; and tethering a directional sensor assembly having a buoyant chamber which exhibits negative buoyancy, two orthogonal hydrophone pairs, and a compass to the mooring platform such that the two orthogonal hydrophone pairs are oriented in a plane substantially co-planer to the top surface of the water, wherein the two orthogonal hydrophone pairs are further oriented relative to a directional magnetic reference signal provided by the compass, and wherein the directional sensor assembly is suspended a pre-defined distance from the bottom ground surface of the body of water.

35. The method of claim 34, wherein the mooring platform includes a raised arm for suspending the buoyant chamber.

* * * * *

UNITED STATES PATENT AND TRADEMARK OFFICE
CERTIFICATE OF CORRECTION

PATENT NO. : 6,418,082 B1
APPLICATION NO. : 09/599230
DATED : July 9, 2002
INVENTOR(S) : Hollis et al.

It is certified that error appears in the above-identified patent and that said Letters Patent is hereby corrected as shown below:

Column 1, line 37, delete "wich" and insert in place thereof --which--.

Column 1, line 44, delete "eg." and insert in place thereof --e.g.--.

Column 2, line 28, delete "a proximately" and insert in place thereof --approximately--.

Column 10, line 54, Claim 3 delete "in" and insert in place thereof --an--.

Signed and Sealed this

Twenty-first Day of April, 2009

JOHN DOLL
*Acting Director of the United States Patent and Trademark Office*